US 10,845,682 B2

(12) United States Patent
Blomquist et al.

(10) Patent No.: US 10,845,682 B2
(45) Date of Patent: *Nov. 24, 2020

(54) GRADE ANNUNCIATOR

(71) Applicant: USNR, LLC, Woodland, WA (US)

(72) Inventors: Christopher W. Blomquist, Ridgefield, WA (US); Carl Flatman, Salmon Arm (CA); Carl Wahlstrom, Woodland, WA (US); Mike O'Heron, Woodland, WA (US); Nick Sunder, Woodland, WA (US)

(73) Assignee: USNR, LLC, Woodland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,173

(22) Filed: Dec. 13, 2017

(65) Prior Publication Data

US 2018/0107101 A1 Apr. 19, 2018

Related U.S. Application Data

(63) Continuation of application No. 14/026,895, filed on Sep. 13, 2013, now Pat. No. 9,874,803.

(60) Provisional application No. 61/801,938, filed on Mar. 15, 2013, provisional application No. 61/714,724, filed on Oct. 16, 2012.

(51) Int. Cl.
*G03B 21/14* (2006.01)
*B27B 31/06* (2006.01)
*G01B 11/25* (2006.01)

(52) U.S. Cl.
CPC ............. *G03B 21/14* (2013.01); *B27B 31/06* (2013.01); *G01B 11/25* (2013.01)

(58) Field of Classification Search
CPC ............... G03B 21/14; G01B 11/2522; G01B 11/2518; G01B 11/25; G01N 21/8986; G01N 33/46; G06T 7/0057
See application file for complete search history.

(56) References Cited

U.S. PATENT DOCUMENTS

| 4,086,496 A | * | 4/1978 | Berry | .................. B27B 31/06 |
| | | | | 144/357 |
| 4,541,722 A | * | 9/1985 | Jenks | .................. B27B 1/007 |
| | | | | 250/559.43 |
| 5,111,861 A | * | 5/1992 | Gore | .................. B27F 7/155 |
| | | | | 100/913 |

(Continued)

*Primary Examiner* — Michelle M Iacoletti
*Assistant Examiner* — Christopher A Lamb, III
(74) *Attorney, Agent, or Firm* — Schwabe Williamson & Wyatt, P.C.

(57) ABSTRACT

Embodiments provide grade annunciator systems that allow a lumber workpiece traveling in a workflow path to be labeled with a projected image that conveys information about the grade, a cut line, and/or the location of a defect in the workpiece. In some embodiments, the system includes a conveyor configured to convey lumber workpieces in a workflow path, and a projector or series of projectors configured to project an image or symbol onto a surface of the workpiece, wherein the image or symbol indicates grade, a cut line, and/or the location of a defect in the workpiece. Other embodiments are methods of labeling a lumber workpiece in a workflow path, the methods includes conveying the lumber workpiece along the workflow path, and projecting an image or symbol onto a surface of the workpiece as it is conveyed along the workflow path.

20 Claims, 9 Drawing Sheets

(56) References Cited

U.S. PATENT DOCUMENTS

| | | | | | |
|---|---|---|---|---|---|
| 5,412,220 | A | * | 5/1995 | Moore | B65G 47/252 144/357 |
| 5,644,392 | A | * | 7/1997 | Soest | G01N 21/8986 250/559.18 |
| 6,031,567 | A | * | 2/2000 | Johnson | G01N 21/8986 348/130 |
| 8,105,009 | B1 | * | 1/2012 | Harper | B27B 31/06 144/245.2 |
| 2011/0050872 | A1 | * | 3/2011 | Harbert | G01N 33/12 348/61 |
| 2013/0176419 | A1 | * | 7/2013 | Conry | G03B 21/142 348/86 |

* cited by examiner

GRADE ANNUNCIATOR

CROSS REFERENCE TO RELATED APPLICATIONS

The present application is a continuation application of and claims priority to U.S. patent application Ser. No. 14/026,895, filed Sep. 13, 2013, which claims priority to U.S. Provisional Patent Application No. 61/714,724, filed Oct. 16, 2012, and to U.S. Provisional Patent Application No. 61/801,938, filed Mar. 15, 2013, all entitled "GRADE ANNUNCIATOR," the entire disclosures of which are hereby incorporated by reference in their entirety.

TECHNICAL FIELD

Embodiments herein relate to the field of lumber processing methods and equipment, and more specifically, to devices and methods for grading and/or tracking, lumber in a lumber processing unit.

BACKGROUND

The production of lumber often involves the use of automated grading systems that use image scanning and processing techniques to identify grade and other characteristics of lumber travelling longitudinally over a conveyor. Once a piece of lumber has been graded, it may be marked with a stamp, ink, or another physical mark to display the grade and sometimes other attributes of each piece of lumber. Typically, this is done by spraying visible colored ink representing various grades onto the lumber.

The lumber is generally transported on lugged or unlugged chains transversely through a mill. Grade printers may be located downstream of a board trimmer to apply a stamp to each board. For example, a lumber grader might call for grade #2-8' on a near end of a board and grade #3-10' on a far end of the board. When this happens, a trimmer will cut an eighteen foot board in two pieces at approximately an eight foot position. Once these different grade boards are on different lugs, they may be stamped with the appropriate grade stamps.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
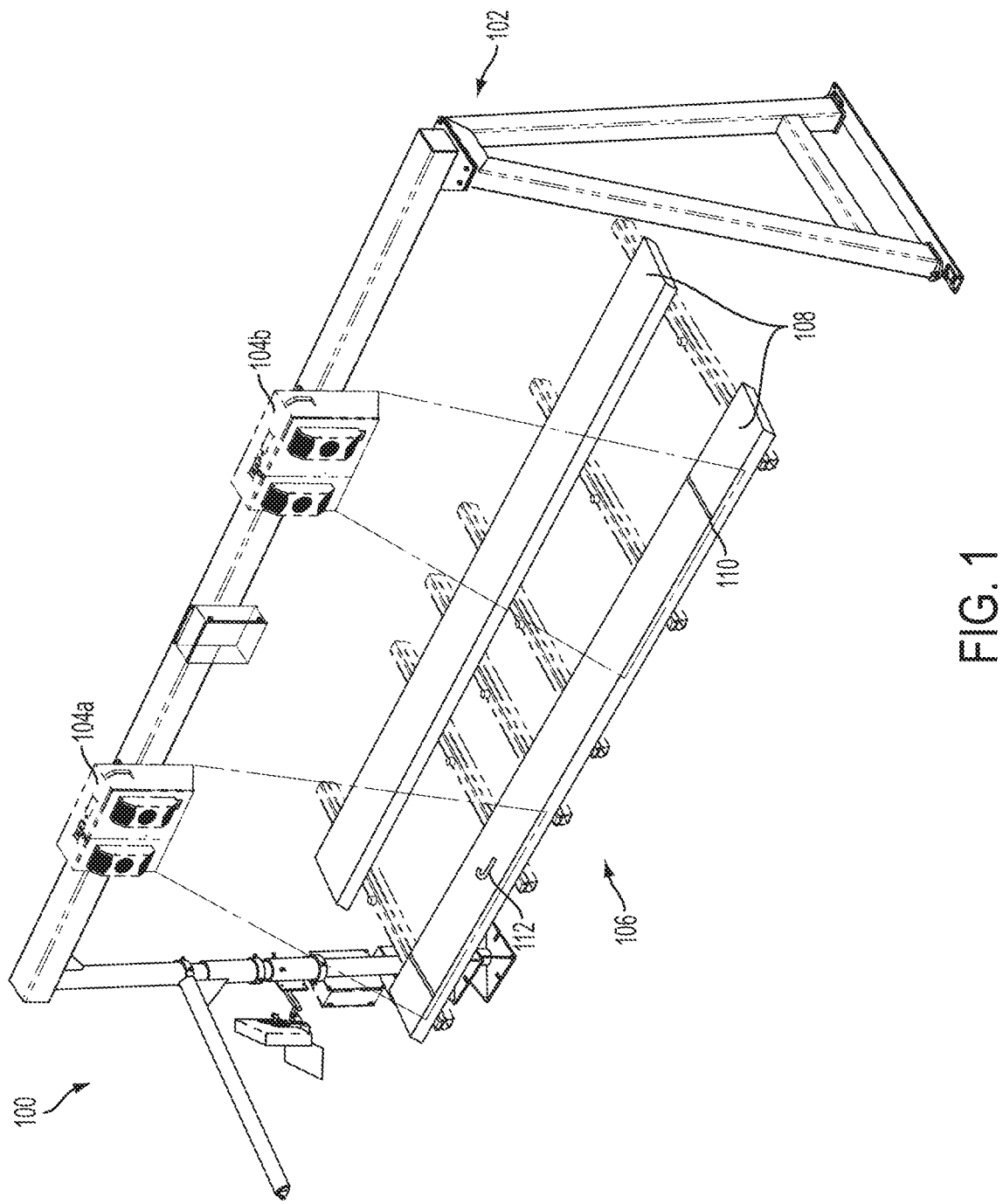
FIG. 1 illustrates a block diagram of a grade annunciator apparatus in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide methods, systems, and apparatus for displaying letters, numbers, indicia, and/or images on boards during lumber processing. Various embodiments of the disclosed methods, systems, and apparatus may display lumber grade information and/or other information on boards travelling through a lumber processing unit, for instance as they pass by check graders. In various embodiments, the system may use one or more projectors, for example, one or more projectors mounted above the lumber flow, to project the grade determined by an optimizer, cut marks, or other information directly onto each board as it passes. In some embodiments, the system may track the projection with the board as it passes by check graders, for instance with an overheard vision camera system. In other embodiments, the image may be stationary as the boards pass by. In some embodiments, a series of stationary images may be projected sequentially from a series of projectors, LEDs, or other light sources, and thus may provide what appears to be an image that travels with each board. In one embodiment, an ID reader device operatively coupled to the light sources determines the identity and/or sequence of the boards.

The projected images may include text, symbols, colored boxes, and/or any other type of image. In some embodiments, a first projector may be used to project text and a second projector may be used to project a shape (e.g., a box or a circle) onto a defect on a workpiece.

Although generally very accurate, automatic grading systems may still require quality control checks, for instance, to ensure that the system is highly tuned. Thus, in various embodiments, check graders may need to receive information regarding the grade the optimizer has assigned to a piece so that they may assess it for accuracy, an so that they may make any desired parameter changes. Additionally, the system may be configured to indicate the location of one or more defects in a board, for example on the top or side of a board. Optionally, the system may be configured to indicate a grade-limiting defect by projecting a mark onto the defective area of the workpiece. This may allow an operator to quickly determine whether the assigned grade is correct or should be changed, and/or to check for other defects not indicated by the system. Thus, various embodiments disclosed herein may provide a simple and effective alternative to traditional paint spray systems and complicated lighting systems. In various embodiments, the boards may emerge from the system having not been marked in any way, such that the freshly planed lumber may remain clean and visually appealing.

In various embodiments, projected symbols and/or colors representing the various grades or other criteria may be customized, thus allowing a user to create symbols that match symbols already in use in a given facility. In some embodiments, saw lines, including near end, far end, and cut-in-two may be projected onto the material in their respective locations, making it easy for a user to view trim decisions. In various embodiments, multiple grades may be projected onto the material, for instance in order to display multi-grade cut-in-two decisions.

In various embodiments, the projections resulting from the disclosed methods, processes, and apparatus may be highly accurate, and may allow materials to be tracked on any surface, such as smooth chain or lugged chain. In some embodiments, the disclosed processes, methods, and apparatus may detect skewed material, and may adjust accordingly. In various embodiments, projecting the grades and other indicia onto the materials (e.g., instead of using traditional paint-based methods), may leave the lumber clean and free of marks.

In various embodiments, the information encoded by the projected text, symbols, and images may include one or more cut lines, marketing information, a downstream destination for the workpiece (e.g., a bin number), a safety message, production information, an advertisement, a cartoon, or any other type of still or moving image. In a specific example, the system may project several images onto a workpiece (e.g., dimensions, grade, and bin number).

In still other embodiments, the projector(s) may project the image(s) onto an object other than the workpiece, such as a wall or a conveyor surface (e.g., a high-contrast surface on the side of a conveyor). Alternatively, the projector(s) may project the image(s) onto the top, side, or end of a workpiece. For example, the system may include a plurality of projectors positioned to project images onto the ends of successive boards.

The system may be used to project images onto workpieces upstream or downstream of a trimmer. Alternatively, the system may be used to project images onto workpieces before or after processing by an edger (flitches), a gang (cants), a resaw (vertical/horizontal), a sorter, or a rip/chop saw (e.g., in remanufacturing systems). In addition, the system may be used to project images onto a log, such as rotational information, log grade/classification, and/or cut pattern.

In one example, a workpiece may be marked with a bar code (which may be, e.g., printed in an ultraviolet ink) that identifies the workpiece. In some embodiments, an ultraviolet light source may be positioned above the conveyor, and a camera may be positioned to detect the bar code. The camera may then communicate identifying information about the workpiece to one or more projectors, which may then project an image onto the workpiece based on the identifying information.

FIG. 1 illustrates a block diagram of a grade annunciator apparatus 100 in accordance with various embodiments. As illustrated, grade annunciator apparatus 100 may include a frame 102 and one or more projector devices 104 mounted to frame 102. In the illustrated embodiment, two projector devices 104 are shown mounted to a frame 102 portion over a conveyor 106 on which workpieces 108 are being conveyed in a transverse orientation. It is to be understood, however, that in other embodiments the location, number, orientation, and configuration of the projector devices, as well as the orientation of the lumber relative to the frame/conveyor/projectors, may be different than in the illustrated example. In the illustrated example, a cut mark 110 and a plurality of grade indicators 112 are projected onto the work pieces.

Figure 2:
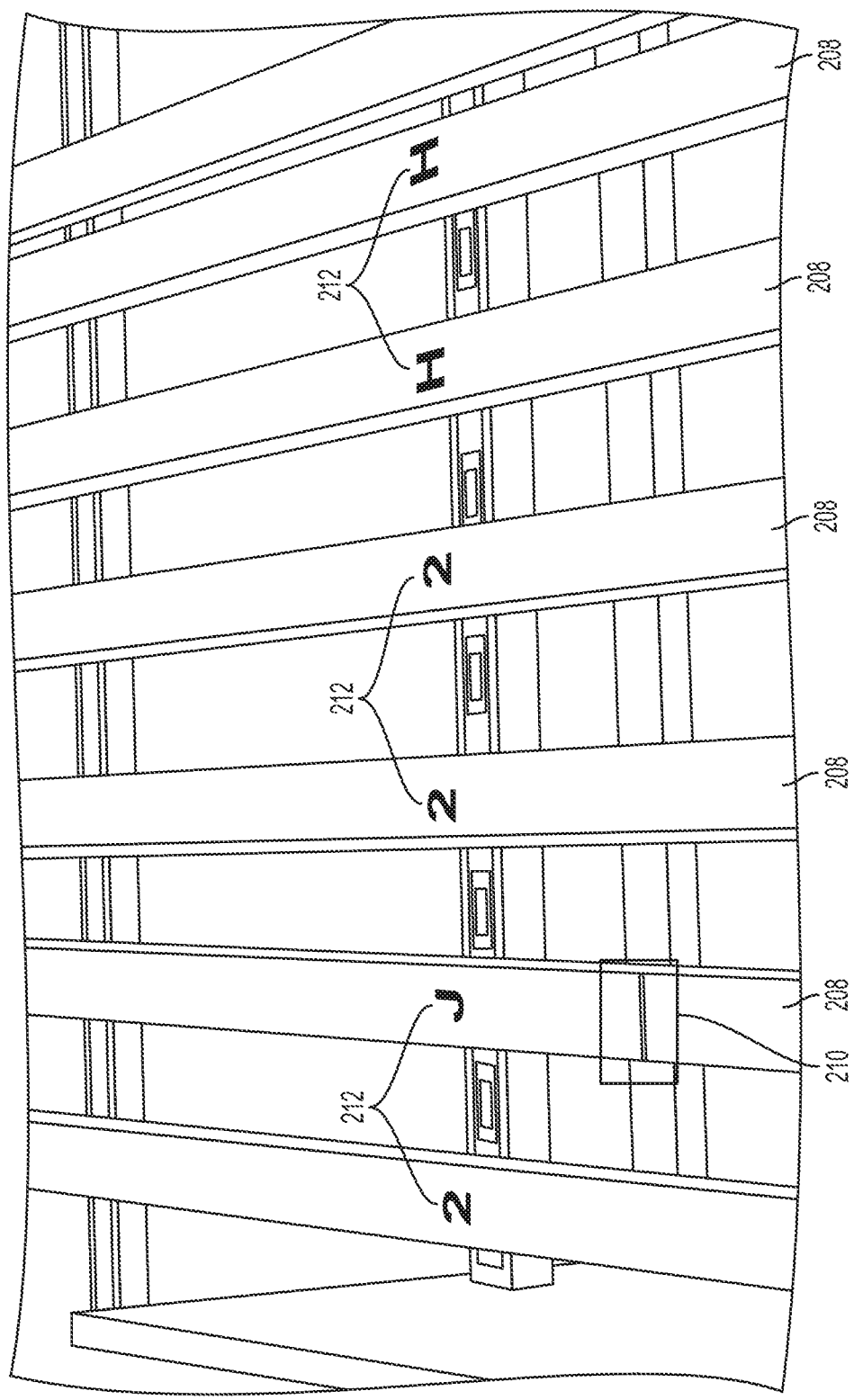
FIG. 2 illustrates a projected image from a grade annunciator apparatus.

FIG. 2 illustrates a projected image from a grade annunciator apparatus. As shown, an elongate bar-shaped image 210 may be projected onto a workpiece 208 to indicate a saw line. Optionally, an alphanumeric character, symbol, or other image 212 may be projected onto the workpiece 208. In some embodiments, a shape (e.g., a square or rectangle) may be projected onto a workpiece to indicate the location of a defect, such a grade-limiting defect.

Figure 3:
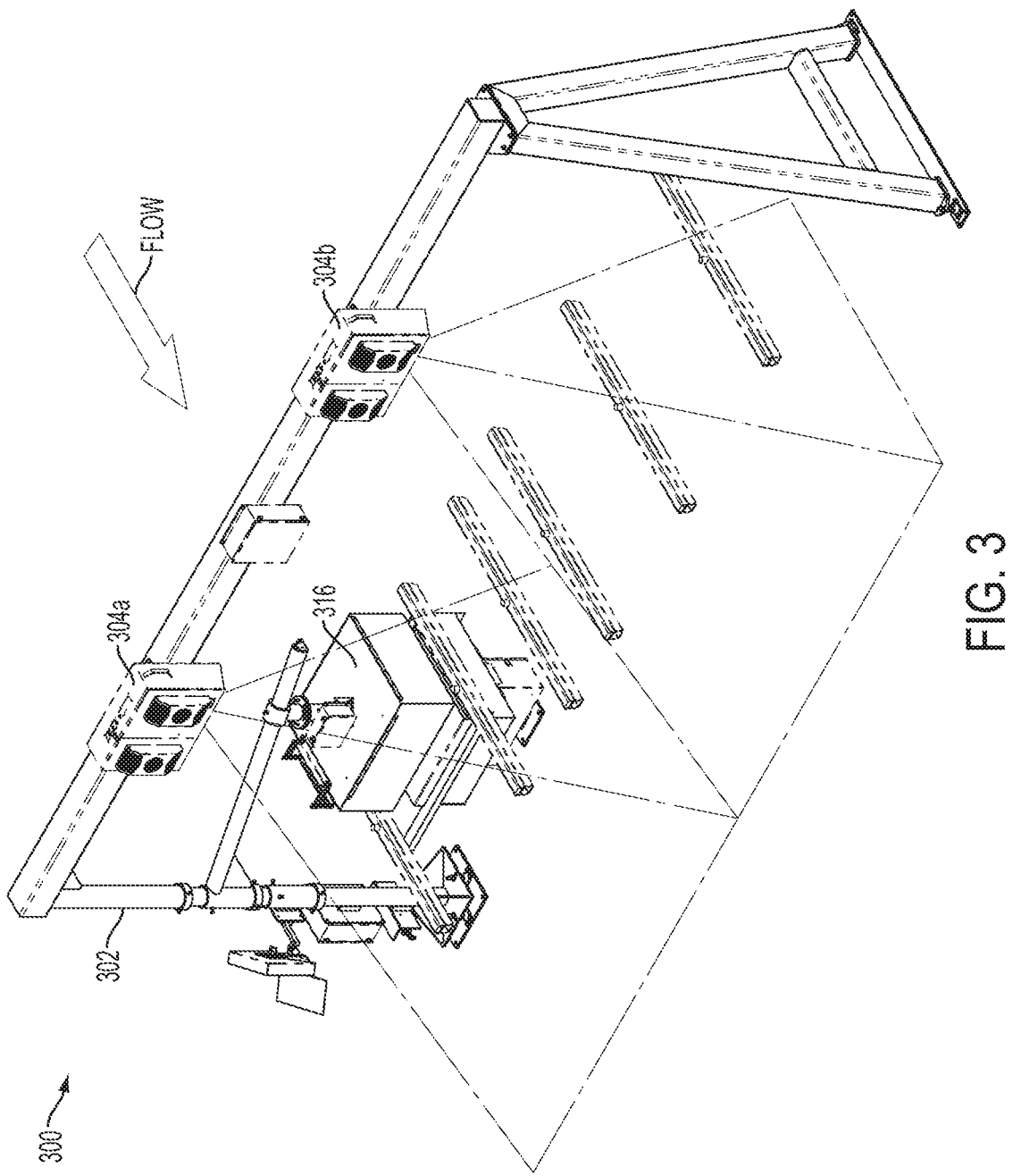
FIG. 3 illustrates a perspective view of a grade annunciator apparatus.

FIG. 3 illustrates a perspective view of a grade annunciator apparatus 300. Grade annunciator apparatus 300 may include a frame 302 and one or more projector devices mounted to frame 302. Optionally, an ID reader assembly 316 may be part of, or be coupled to, frame 302. Frame 302 may further include two or more generally vertical supports coupled to a generally horizontal support. The generally horizontal support may be positioned above a transport surface (e.g., generally perpendicular to a direction of flow). The one or more projector devices 304 may be mounted to the horizontal support. Alternatively, the projector device(s) 304 may be mounted to the vertical supports or to another structure, such as a wall, a beam, or a portion of an upstream or downstream component of a workpiece processing line.

Figure 4:
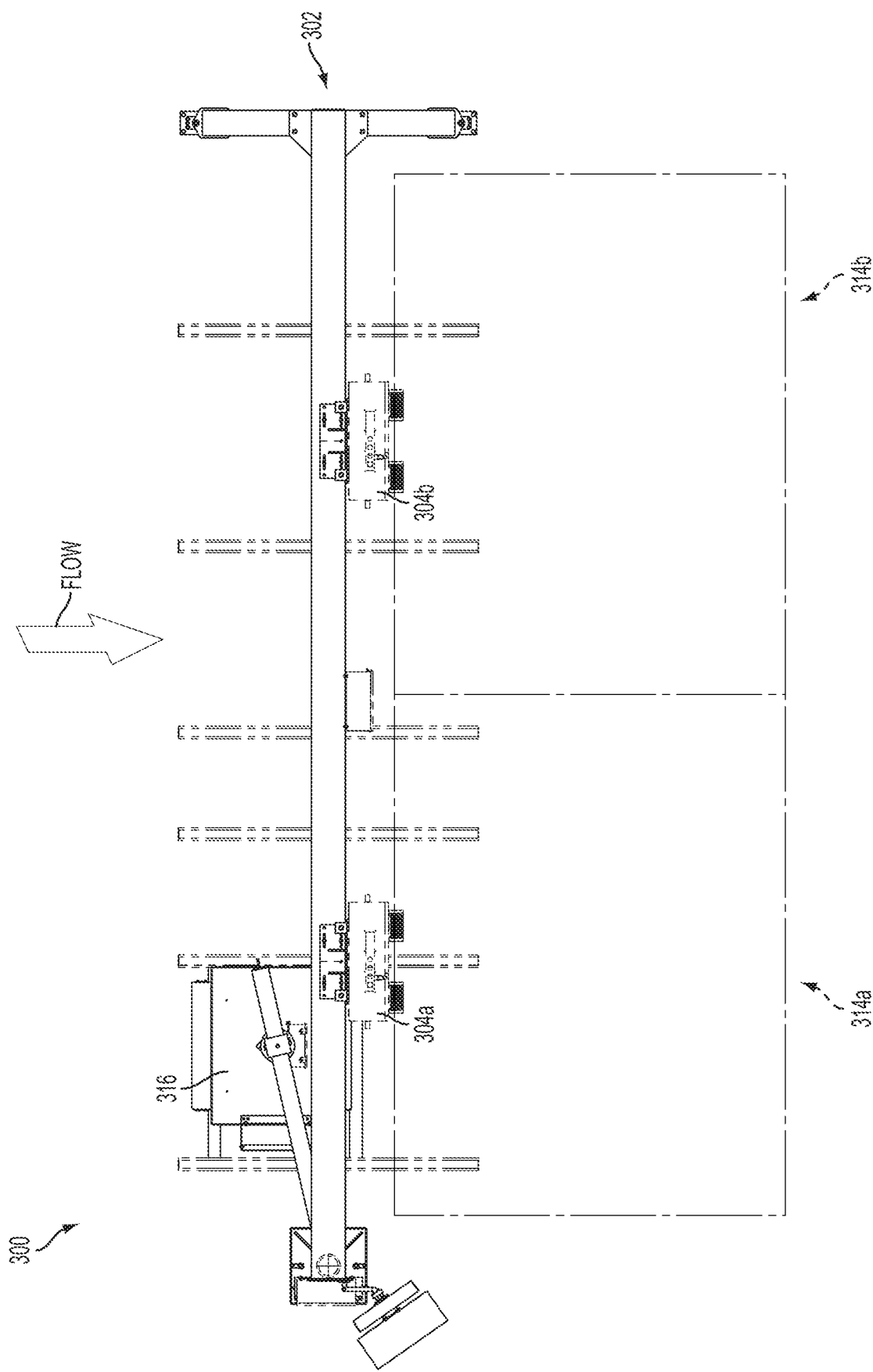
FIG. 4 illustrates a plan view of the grade annunciator apparatus of FIG. 3.
Figure 5:
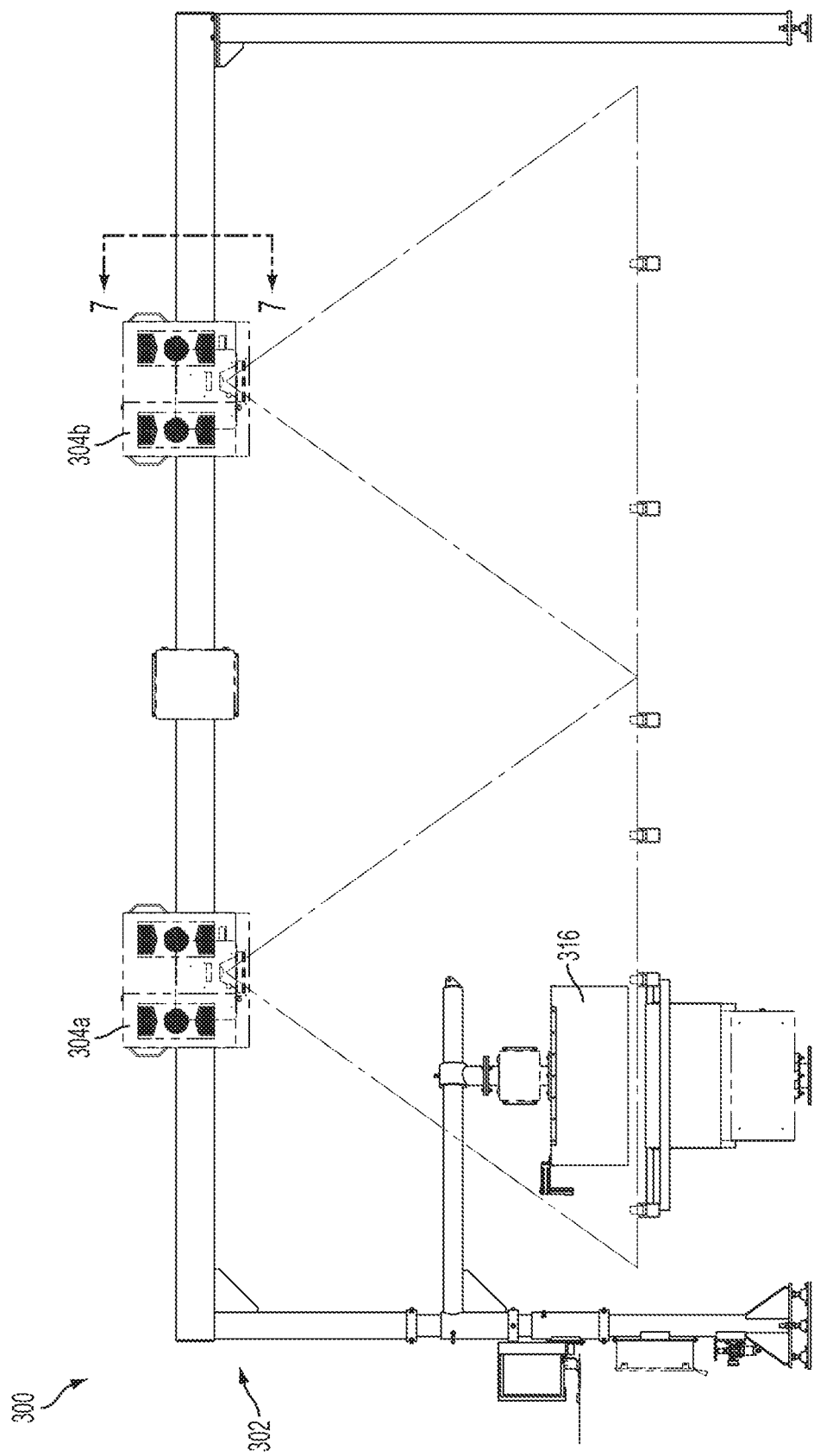
FIG. 5 illustrates an elevational view of the grade annunciator apparatus of FIG. 3.
Figure 6:
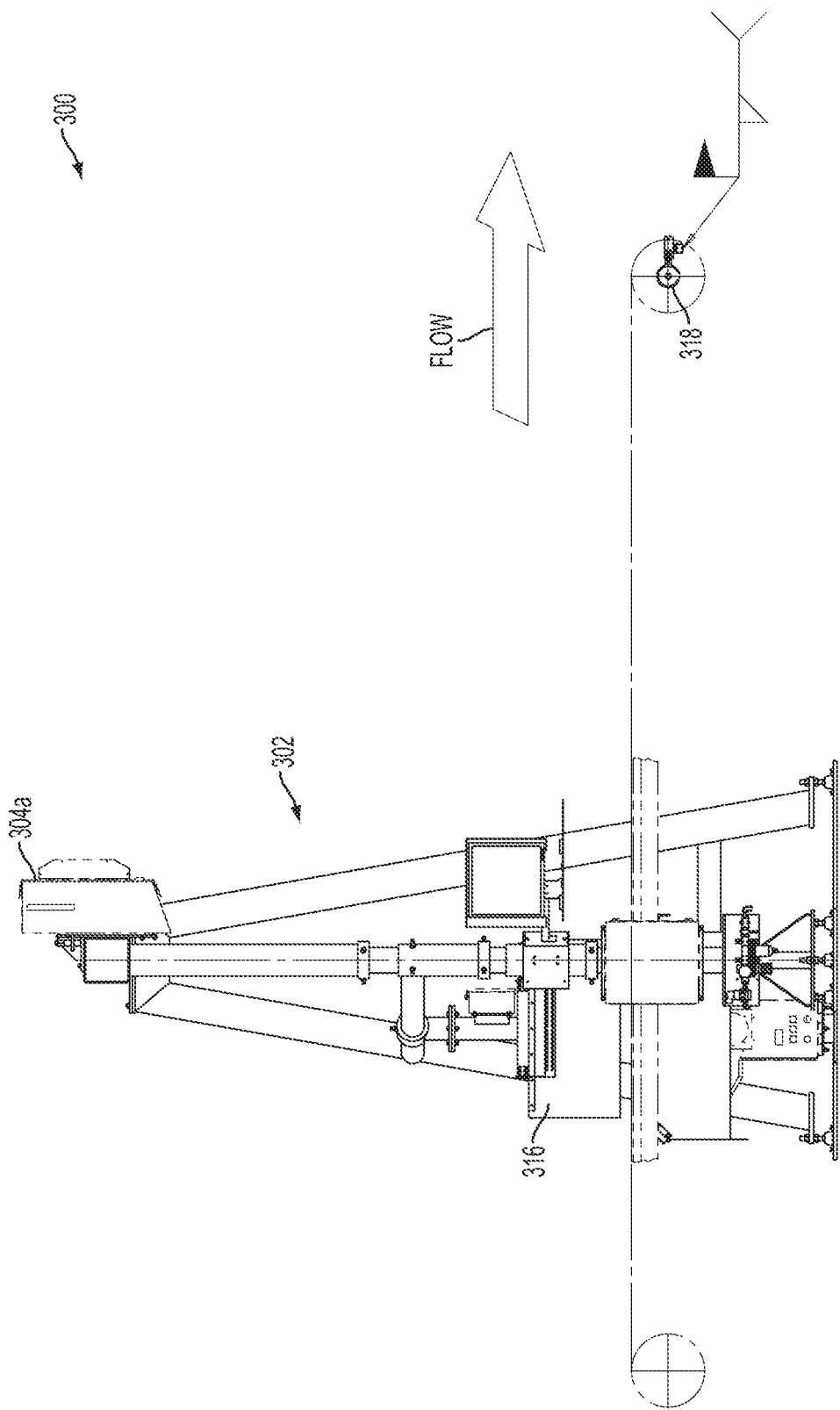
FIG. 6 illustrates a side elevational view of the grade annunciator apparatus of FIG. 3.

FIGS. 4-6 illustrate a plan view (FIG. 4), an elevational view (FIG. 5), and a side elevational view (FIG. 6), respectively, of grade annunciator apparatus 300. Two or more projectors 304 may be positioned on frame 302 such that their fields of projection 314a, 314b meet or overlap across the underlying transport surface. The ID reader 316 may be positioned over the transport surface in order to read an identifier on a workpiece on the transport surface (e.g., a bar code printed in ultraviolet ink on the workpiece). Optionally, one or more lights (e.g., LED, ultraviolet light source, etc.) may be coupled to frame 302, ID reader assembly 316, and/or other structure proximal to the grade annunciator apparatus 300. In some embodiments, an ID printer and/or a second ID reader may be positioned upstream of the grade annunciator apparatus. As shown in FIG. 6, an encoder 318 may be provided downstream of frame 302.

Figure 7:
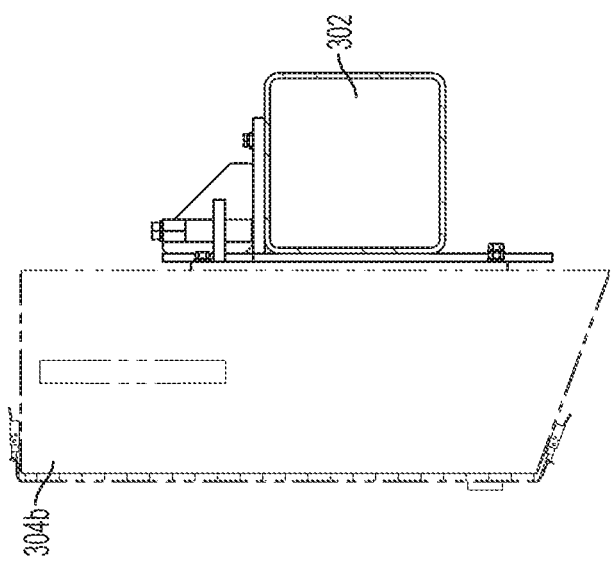
FIG. 7 illustrates a sectional view of a projector housing taken along lines A-A of FIG. 5.

FIG. 7 illustrates a sectional view of a projector housing taken along lines A-A of FIG. 5.

Figure 8:
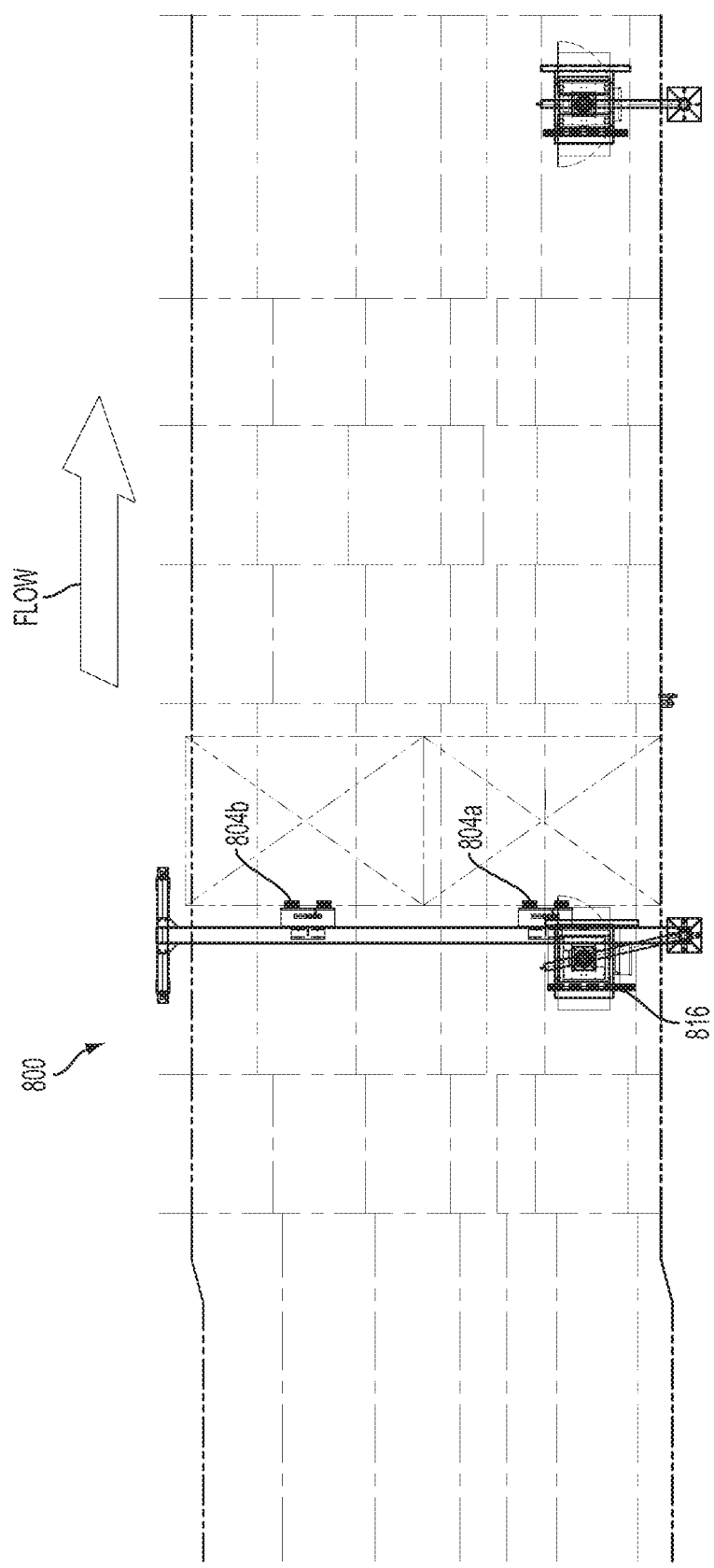
FIG. 8 illustrates a plan view of a transverse portion of a processing line with a grade annunciator apparatus as shown in FIGS. 3-7.
Figure 9:
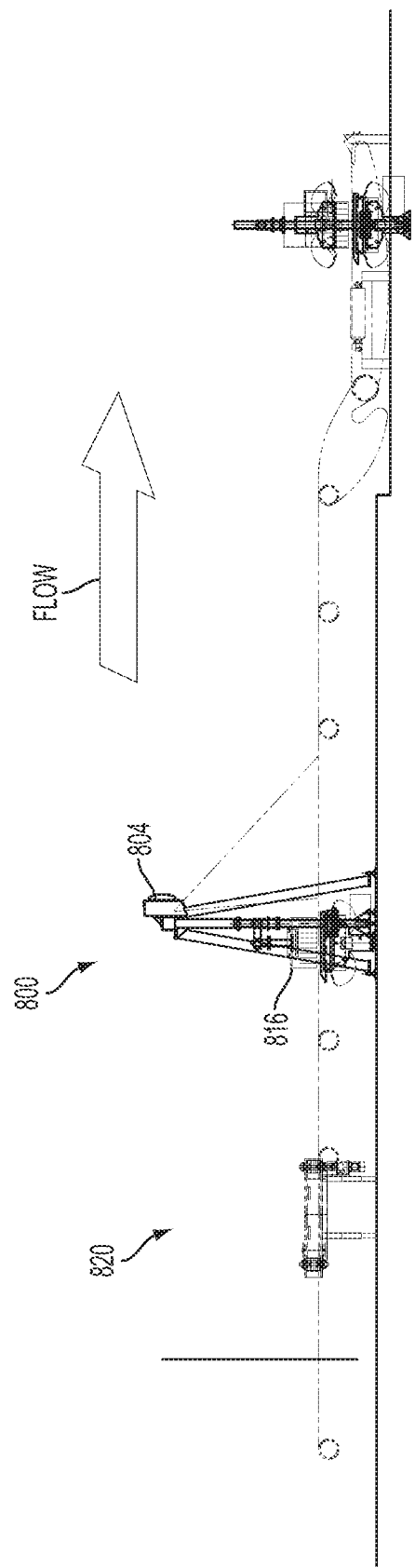
FIG. 9 illustrates an elevational view of the transverse portion of the processing line shown in FIG. 8, all in accordance with various embodiments.

FIGS. 8-9 illustrate a plan view and an elevational view, respectively, of a transverse portion of a processing line that includes a grade annunciator apparatus 800. As illustrated, workpieces may be even-ended by a fence or other board ending device positioned upstream of the grade annunciator apparatus 800. One or more storage/landing tables 820 may also be positioned upstream of the grade annunciator apparatus 800. The workpieces may be conveyed on a lugged transfer through the grade annunciator apparatus 800. Optionally, ID codes printed on the ends of the workpieces may pass below the ID reader 816, which may be in electronic communication with a computer system and the projector devices 804a, 804b. Based on the detected code of the workpiece and workpiece characteristic data associated with that ID code (e.g., scan data from an upstream scanner), the computer system may determine that one or more alphanumeric characters, symbols, shapes, and/or other images should be projected onto that workpiece. The computer system may also identify a target location on the workpiece, such as a location of a significant defect, for projection of an image. The computer system may then control the projector devices, directly or via a controller, to project the selected image(s) onto the workpiece in the desired location(s). One or more human operators may be positioned within view of the projected images in order to confirm or reject the grade decisions and/or other information represented by the projected images.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A grade annunciator system for displaying information about a wood workpiece traveling in a first direction along a flow path on a conveyor and oriented generally transverse to the first direction, the grade annunciator system comprising:
    a first projector positioned to project a first image onto a surface of the workpiece as the workpiece travels along the flow path on the conveyor through a first field of projection of the first projector; and
    a computer system configured to
        identify a first target location on the workpiece for projection of the first image, based at least on scan data acquired by a scanner upstream of the first projector, wherein the first target location is a location of a defect or a predicted cut, and
        in response to identifying the first target location, cause the first projector to project the first image onto the first target location as the workpiece travels through the first field of projection, such that the location of the first image indicates the location of the defect or predicted cut.

2. The grade annunciator system of claim 1, wherein the computer system comprises an optimizer configured to determine a grade of a piece of lumber to be cut from the workpiece, the computer system is configured to cause the projector to project a second image onto the workpiece, and the second image represents said grade.

3. The grade annunciator of claim 1, wherein the system further comprises a second projector with a second field of projection, the first and second projectors are arranged across the flow path such that the fields of projection meet or overlap along a longitudinal axis of the conveyor, and the instructions are further operable to cause the second projector to project a second image onto a second target location on the workpiece as the workpiece travels along the flow path through the fields of projection.

4. The grade annunciator of claim 3, wherein the target locations are locations of predicted cuts and the first and second images are images of cut lines.

5. The grade annunciator of claim 1, wherein the computer system is configured to cause the first projector to project the first image such that the first image moves with the workpiece as the workpiece travels through the first field of projection along the flow path.

6. The grade annunciator of claim 5, further including a vision camera system operatively coupled with the computer system and configured to track the workpiece as the workpiece travels along the flow path.

7. The grade annunciator of claim 6, wherein the first projector comprises a series of projectors arranged along the flow path, and wherein the computer system is configured to cause the series of projectors to sequentially project the first image as a stationary image to thereby cause the projected first image to track with the first workpiece as the first workpiece travels along the flow path.

8. The grade annunciator of claim 6, wherein the first projector comprises a series of LEDs arranged along the flow path, and wherein the computer system is configured to cause the series of LEDS to sequentially project the first image as a stationary image to thereby cause the projected first image to track with the workpiece as the workpiece travels along the flow path.

9. The grade annunciator of claim 1, wherein the computer system is configured to cause the first projector to project the first image such that the first image remains stationary as the workpiece travels along the flow path.

10. The grade annunciator of claim 1, wherein the first target location is a location of a defect and the first image is an image of a geometric shape.

11. The grade annunciator of claim 1, wherein the conveyor comprises a non-lugged chain.

12. The grade annunciator of claim 1, wherein the conveyor comprises a lugged chain.

13. A method of labeling a lumber workpiece as the workpiece travels along a flow path on a conveyor, the method comprising:
    identifying a first target location on the workpiece for projection of a first image, based at least on scan data acquired by a scanner upstream of a field of projection of a first projector, wherein the first target location is a location of a defect or a predicted cut; and
    in response to identifying the first target location, using the first projector to project the first image onto the first target location as the workpiece is conveyed along the flow path through the field of projection, such that the location of the first image indicates the location of the defect or predicted cut.

14. The method of claim 13, further including determining a grade of a piece of lumber to be cut from the workpiece.

15. The method of claim 14, wherein the method further comprises using the first projector to project the determined grade onto the workpiece as the workpiece is conveyed along the flow path through the first field of projection.

16. The method of claim 13, wherein the method further comprises using an overhead vision camera system to track the workpiece as the workpiece is conveyed along the flow path.

17. The method of claim 16, wherein the method further comprises using the overhead vision camera system to direct the first projector to move the projected first image with the workpiece as the workpiece is conveyed along the flow path.

18. The method of claim 13, wherein the method further comprises detecting an identification code on the workpiece, and wherein the scan data is associated with the identification code.

19. The method of claim 13, wherein the method further comprises:
    using a second projector to project a second image onto a second target location on the workpiece as the workpiece is conveyed through the field of projection, wherein the second image indicates a grade, a second predicted cut line, and/or a second defect in the workpiece.

20. The method of claim 19, wherein the first and second target locations are locations of first and second predicted cut lines, respectively, and the first and second fields of projection meet or overlap along a longitudinal axis of the conveyor.

* * * * *